UNITED STATES PATENT OFFICE.

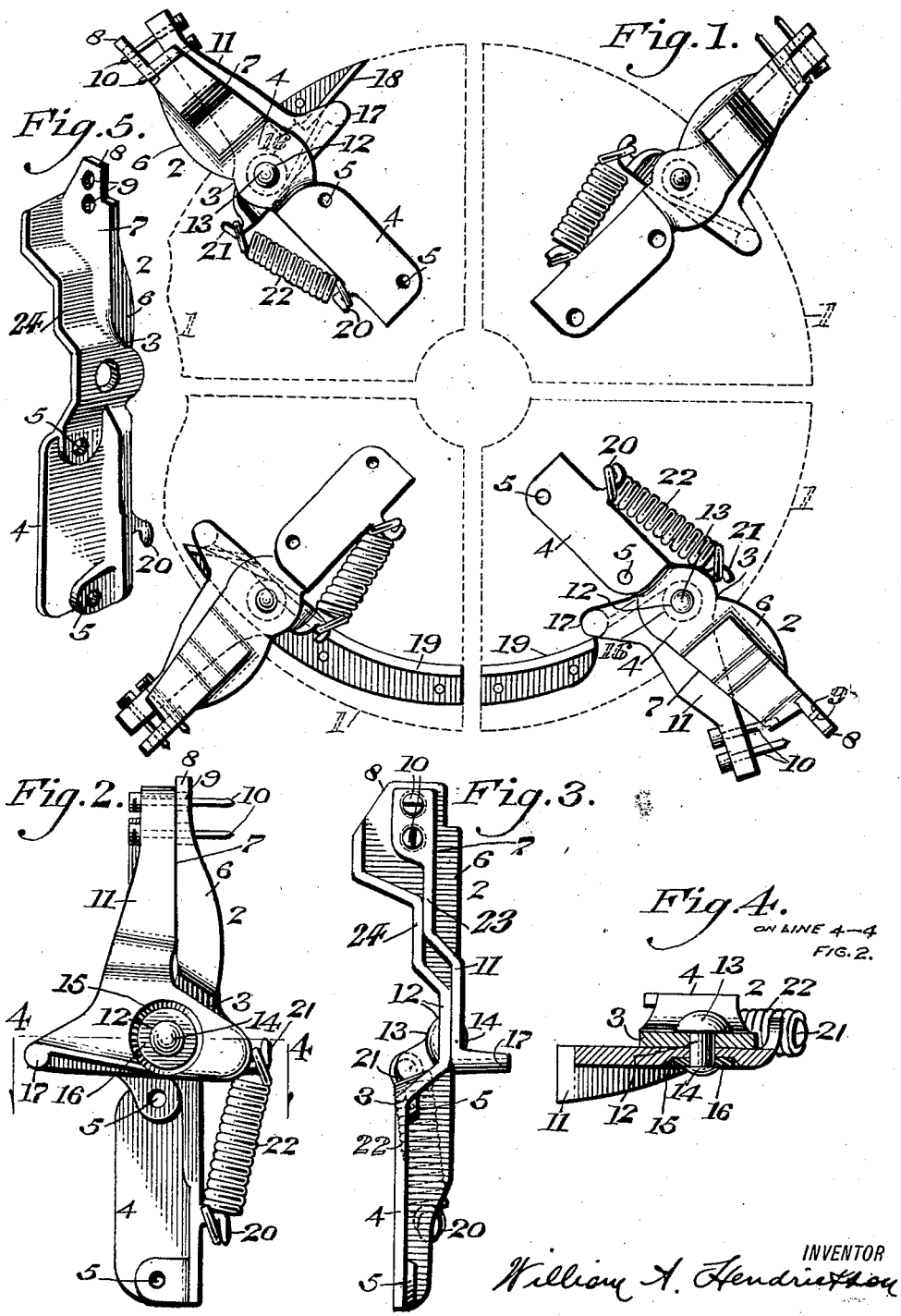

WILLIAM A. HENDRICKSON, OF RIVERTON, NEW JERSEY, ASSIGNOR TO McWHORTER MANUFACTURING COMPANY, OF RIVERTON, NEW JERSEY, A CORPORATION OF NEW JERSEY.

POTATO-PICKER MECHANISM FOR POTATO-PLANTERS.

1,312,984.      Specification of Letters Patent.      Patented Aug. 12, 1919.

Application filed June 20, 1919. Serial No. 305,547.

*To all whom it may concern:*

Be it known that I, WILLIAM A. HENDRICKSON, a citizen of the United States, residing at Riverton, county of Burlington, State of New Jersey, have invented a new and useful Potato-Picker Mechanism for Potato-Planters, of which the following is a specification.

In a prior patent granted to Allen McWhorter, No. 1,287,601, December 10th, 1918, there is shown, described and broadly claimed a novel construction of a potato planter, which is provided with a rotatable device which is adapted to operate at intervals to impale potatoes and release the same so that they are dropped uniformly and regularly to the ground in the operation of planting, provision being made for rendering the impaling mechanism inoperative, so as to stop the planting when desired.

My present invention consists particularly of improvements in the picker mechanism employed shown particularly in Figures 6 to 9 of the patent aforesaid.

I have found from practical experience, that after the pivotal members of the impaling mechanism in the construction aforesaid have been continuously operated for a long period, the pivotal connections sometimes wear or become loose, in which event the impaling pins may not properly register or aline with the openings through which they pass and as it is essential that said impaling pins always properly aline with their coacting openings through which they pass, I have found it desirable in some instances to improve the construction seen in the picker mechanism shown in the aforesaid figures of said patent by providing said pivotal members with guiding devices or guiding abutments which are adapted to contact at all times and I in addition arrange the spring or tension device so that it will exert a pull on the pivotal member in such a direction that the coacting guiding abutments will always be in contact, whereby the movements of said pivotal member will always be properly guided and said impaling pins will always aline with the openings and there will be no liability of their getting out of alinement with said openings.

To the above ends my invention consists of a novel construction of picker mechanism comprising two members pivotally mounted and provided with novel pivotal connections and having guiding abutments which are always in contact by reason of the pull exerted upon the pivotal member by a spring or similar tension device which is so collocated with respect to the pivotal members that the guiding abutments will always tend to contact and thereby properly guide the impaling pins with respect to their coacting openings.

For the purpose of illustrating my invention, I have shown in the accompanying drawing one form thereof which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Fig. 1 represents a side elevation of a potato picker mechanism, embodying my invention, showing the elements thereof constituting my invention in assembled position.

Fig. 2 represents a side elevation showing one of the picking devices in detached position.

Fig. 3 represents a plan view of Fig. 2.

Fig. 4 represents a section on line 4—4 of Fig. 2.

Fig. 5 represents a perspective view of one of the picker members, with the pivotal member removed therefrom.

Similar numerals of reference indicate corresponding parts.

Referring to the drawings.

1 designates the head supporting the potato picking devices 2, which are in practice eight in number and are properly spaced apart, as indicated in Fig. 1, said devices comprising a relatively stationary member and a pivotal member. The stationary member comprises the body portion 3 having the shank 4 provided with the bolt holes 5, whereby it is secured by suitable fastening devices to the head 1. 6 designates an arm which is preferably integral with said shank and provided with the wall 7, which terminates in the extension 8, having the holes 9 therethrough, through which project the pins 10 carried on the pivotal or movable arm 11, which is fulcrumed to the body 3 by means of the rivet 12 or the like, said rivet having the heads 13 and 14 and the arm 11 being provided with the recess 15 in which is seated the washer 16 against which the head 14 bears. The washer and recess can be in the member 3, if desired. 17 designates a cam member on the arm 11 which is adapted to engage the cams 18 and 19 at the proper intervals. 20 designates a hook perferably cast on the shank 4, so as to be slightly out of alinement with the hook 21 preferably cast on the pivotal arm 11, whereby the spring 22 will tend to exert a pull on the arm 11 in such a direction that the guiding abutment 23 thereof, best seen in Fig. 3, will tend to ride at all times against and contact with the contiguous guiding abutment 24 of the body portion 3.

In my present invention I have shown the guiding members or guiding abutments 23 and 24 as being formed on a web of the stationary member 3 and the pivotal member 11 so that their contiguous surfaces when the device is assembled contact substantially as seen in Fig. 3 but it will be apparent that these guiding devices or their equivalent may be cast or otherwise formed on other portions of said members 3 or 11 without departing from the spirit or scope of my invention, so long as they perform the functions herein described, to wit, of causing the impaling pins 10 under all conditions to properly aline with their coacting openings 9.

The operation is as follows:—

It will be understood by reference to the prior patent of Allen McWhorter, No. 1,287,601, that the general arrangement and collocation of the various elements herein disclosed and their general mode of operation is substantially the same as disclosed in said patent and I therefore deem it unnecessary to describe in detail the entire cycle of operation shown in the patent aforesaid, except to say that the manner of tripping or intermittently actuating the pivotal members 11 is substantially the same as in the patent aforesaid.

The importance and advantages of my present invention will, however, be apparent from a comparision of Fig. 8 of the patent aforesaid with Fig. 3 herein, since it will be seen in my present invention, that I provide the guiding abutments 23 and 24 for the relatively pivotal and stationary members and by the collocation of the spring 22 with respect to said members, as seen in Fig. 3, it will be seen that the pivotal member or arm 11, as it is tripped or oscillated upon its pivot will at all times have its guiding abutment 23 in contact with the guiding abutment 24 of the relatively stationary member, so that the impaling pins 10 will under all conditions aline with their coacting holes 9 and further by reason of the employment of the recess 15 and washer 16 seated therein, any liability of the pivotal members wearing or becoming loose is reduced to a minimum.

It will now be apparent that I have devised a novel and useful construction of a potato picker mechanism for potato planters which embodies the features of advantages enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a potato planter, a pair of arms, one stationary and one pivotal, a pivot for said pivotal arm, an impaling pin on said pivotal arm movable through an opening in said stationary arm, said opening acting as a wiper for said impaling pin to remove the potato therefrom, a guiding abutment on said stationary arm located intermediately of said pivot and pin, a contiguous guiding abutment on said pivotal arm, and means for holding the juxtaposed faces of said guiding abutments in contact.

2. In a potato planter, a pair of arms, one stationary and one pivotal, a pivot for said pivotal arm an impaling pin on said pivotal arm movable through an opening in said stationary arm, said opening acting as a wiper for said impaling pin to remove the potato therefrom, a guiding abutment on said stationary arm located intermediately of said pivot and pin, a contiguous guiding abutment on said pivotal arm, the juxtaposed faces of said guiding abutments being always in contact, and a spring common to said stationary and pivotal members for causing the contiguous faces of said guiding abutments to always contact.

3. In a potato planter, a pair of arms, one stationary and one pivotal, an impaling pin on said pivotal arm movable through an opening in said stationary arm, said opening acting as a wiper for said impaling pin to remove the potato therefrom, a guiding abutment on said stationary arm located intermediately of said pivot and pin, a contiguous guiding abutment on said pivotal arm, the juxtaposed faces of said guiding abutments being always in contact, a spring common to said stationary pivotal members for causing the contiguous faces of said guiding abutments to always contact, said pivotal member having a recess therein at its pivotal point, a washer seated in said recess, and a rivet common to said washer and said stationary and pivotal members.

WILLIAM A. HENDRICKSON.

Witnesses:
C. D. McVay,
E. Hayward Fairbanks.